(No Model.) 2 Sheets—Sheet 1.
W. ORCUTT.
CORN HARVESTER.
No. 456,055. Patented July 14, 1891.
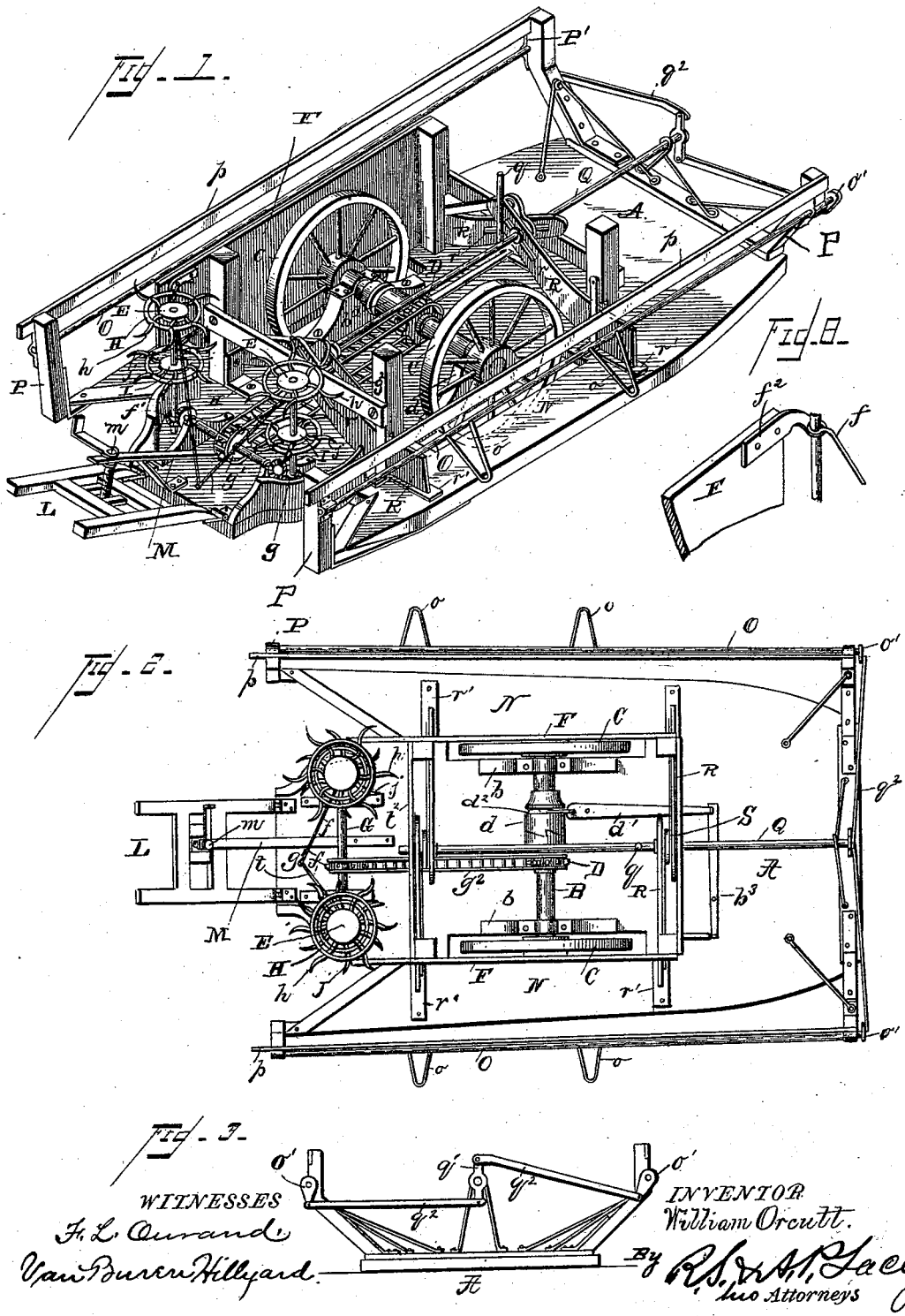
WITNESSES
F. L. Ourand
Van Buren Hillyard
INVENTOR
William Orcutt
By R. S. & A. P. Lacey
his Attorneys (No Model.) 2 Sheets—Sheet 2.
W. ORCUTT.
CORN HARVESTER.
No. 456,055. Patented July 14, 1891.
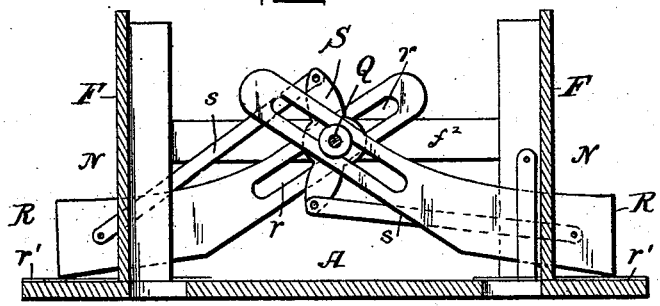
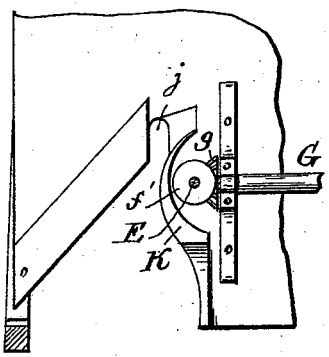
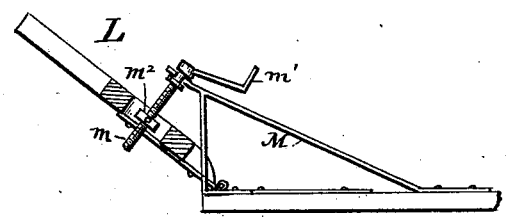
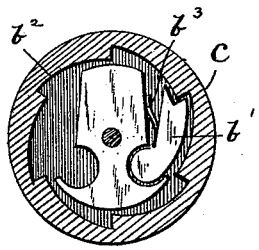
WITNESSES:
Saml. R. Turner
Van Buren Hillyard
INVENTOR
William Orcutt.
BY
R.S.A.R. Lacey
HIS ATTORNEY'S:

UNITED STATES PATENT OFFICE.

WILLIAM ORCUTT, OF ABILENE, KANSAS.

CORN-HARVESTER.

SPECIFICATION forming part of Letters Patent No. 456,055, dated July 14, 1891.

Application filed October 24, 1890. Serial No. 369,260. (No model.)

*To all whom it may concern:*

Be it known that I, WILLIAM ORCUTT, a citizen of the United States, residing at Abilene, in the county of Dickinson and State of Kansas, have invented certain new and useful Improvements in Corn-Harvesters; and I do hereby declare the following to be a full, clear, and exact description of the invention, such as will enable others skilled in the art to which it appertains to make and use the same.

This invention relates to corn-harvesters, and has for its object the provision of a machine that can be handled as readily as a two-wheeled cart, which can be quickly adjusted to cut the stalks at any required distance from the ground, and which will carry the fodder in boxes in troughs on each side of the machine until a sufficient quantity has accumulated, when it is thrown from the machine by the operation of a lever.

The improvement consists of the novel features and the peculiar construction and combination of the parts, which will be hereinafter more fully described and claimed, and which are shown in the annexed drawings, in which—

Figure 1 is a perspective view, one side of the fodder-box being removed, of a machine embodying my invention. Fig. 2 is a top plan view of the machine. Fig. 3 is a detail view of the operating-shaft, the rock-shafts at the sides of the machine which are provided with the arms which close the outer sides of the fodder-boxes, and the mechanism for connecting the operating-shaft with the rock-shafts. Fig. 4 is a detail view of the ejectors, the operating-rod, and the parts connecting the ejectors with the said operating-shaft. Fig. 5 is a detail plan view of the cutter and the fender. Fig. 6 is a detail section of the front portion of the machine, showing the provisions for adjustably connecting the thills with the frame of the machine, whereby the front end of the latter is elevated or depressed. Fig. 7 is a detail view of the clutch mechanism between the wheels and the axle. Fig. 8 is a detail view showing the upper bearing for the reel-shafts.

The platform A is supported on the wheels C C, which are mounted on the ends of the axle B, the latter being journaled on the bearings $b\ b$, that are provided on the platform midway of the ends thereof, so that the said platform will be balanced on the said axle.

The sprocket-wheel D, mounted on the axle so as to turn loosely thereon, is provided on one side with a holding-clutch, which is adapted to be engaged by a corresponding holding-clutch on the opposing end of the sleeve $d$, which is mounted on the axle to turn therewith, but is adapted to be moved thereon to and from the clutch on the sprocket-wheel D. The lever $d'$, having its front end fitted in the annular groove $d^2$ in the sleeve $d$, is provided to move the sleeve $d$ on the axle B to and from the sprocket-wheel to key the latter with the axle and set the reels in motion. The notched lever $d^3$ is adapted to engage with the bent end of lever $d'$ and hold it in either of its two positions. The spring-stop $d^4$ holds the notched lever in engagement with the said lever $d'$.

The reel-standards E E are journaled at their lower ends to the platform and near their upper ends in the brackets $f^2$, which are secured to the sides F of the fodder-boxes, and are braced by the stay-rods $f$. The miter-pinions $f'$, near the lower ends of the reel-standards, mesh with corresponding miter-pinions $g$ on the ends of the counter-shaft G, which is provided with the sprocket-pinion $g'$, around which and the sprocket-wheel D the sprocket-chain $g^2$ passes. The reels H and I on each standard E are of different diameter and located at different levels. The arms $i$ of the lower reel curve backward or in a reverse direction to the movement of the said reels to crowd the stalks onto the oblique cutting-knives. The arms $h$ of the upper reel are ogee-shaped, the outer portions curving forward or in the direction of motion of the reel.

The fenders K K curve outward between their ends and are sufficiently high to prevent the fodder becoming entangled with the gearing $f'\ g$. The space $j$ at the inner ends of the cutting-knives permits the escape of the weeds and trash and prevents the lodgment of the same in the angle formed between the said knife and the juxtaposed portion of the platform, as shown.

The thills L are coupled with the platform in the usual manner, and are adjusted with reference to the platform by any mechanism, such as the screw $m$, provided with crank $m'$, the nut $m^2$, secured to the thills, and the bracket M, the latter being secured to the platform and overhanging the thills and receiving the screw $m$. By operating the screw $m$ the thills will be raised or lowered and the front end of the platform will be depressed or elevated to regulate the height of the cut of the fodder.

The fodder-boxes N are formed on each side of the machine between the sides F and the arms $o$ on the rock-shafts O, which are journaled at their ends on the standards P and P', that are at opposite ends of the platform. These standards are connected by the bar $p$. The sides F F are parallel, but the outer sides slope inward from front to rear. Thus the fodder-boxes are wider at their front ends than at their rear ends to permit the machine to pass between the bunches of fodder without disturbing them. The operating-shaft Q is journaled between the sides F F on cross-bars $f^2$, and is provided with the operating-handle $q$. The diametrically-opposite extending arms $q'$ at the rear end of shaft Q are connected with the cranks $o'$ on the rock-shafts O by the pitman $q^2$.

The elbow-shaped ejectors R R, provided in pairs, one pair being located near the front and the other near the rear of the fodder-boxes, cross and have their arms slotted at $r$ to permit the passage therethrough of the operating-shaft Q. The diametrically-opposite extending arms S on the shaft Q between the ejectors R of each pair have their ends connected by pitmen with the lower ends of the said ejectors R, substantially as shown. The plates $r'$ on the platform are for the lower ends of the ejector to travel on and prevent wearing of the platform.

To use the machine it is drawn over the field between two rows of cane, corn, or other growth to be cut down. The reels being in gear with the axle will revolve and bring the cane or stalks in such position as to be readily cut by the knives J, after which they will throw it into the fodder-boxes. After sufficient cane or fodder has accumulated in the fodder-boxes the shaft Q is operated, which, through the instrumentalities hereinbefore specified, will cause arms $o$ to turn out and the ejectors to be projected and discharge the fodder laterally from the fodder-boxes. When the shaft Q is operated in a reverse direction, the arms $o$ are made to close the outer sides of the fodder-boxes and the ejectors are retracted within the sides F F.

It will be observed that each of the reels H and I is provided with rings which are concentric with the reel-standards and which are secured to the reel-arms. These rings $h'$ and $h'$ are secured to the arms $h$ and $i$ of the arms of the reels H and I, respectively, and are of proper size to prevent the fodder falling to the center of the reels, and also serves to brace the said arms $h$ and $i$.

The drive-wheels are loosely mounted on the axle B and are provided on one side with the plates $c$, which are recessed to receive the heel of the pawls $b'$. The internally ratchet-toothed disks $b^2$ are keyed to revolve with the axle. The free ends of the pawls engage with and turn the said disks $b^2$ and the axle on the forward motion of the machine, and ride over the teeth on the said disks in the event of the machine being run back. The springs $b^3$ hold the free ends of the pawls in engagement with the teeth of the disks $b^2$.

Having thus described my invention, what I claim, and desire to secure by Letters Patent, is—

1. A corn-harvester having in co-operative relation a platform provided near each front corner with cutting-knives and at each side with fodder-boxes, ejectors provided in pairs and having the ejectors of each pair extending in opposite directions, rock-shafts O, having arms $o$ for closing the outer sides of the fodder-boxes, and the operating-shaft having connection with the said rock-shafts and with the ejectors to operate them simultaneously, substantially as described, for the purpose specified.

2. In a corn-harvester having a fodder-box at each side, the combination, with rock-shafts O and arms $o$ for closing the outer sides of the said fodder-boxes, of the operating-lever Q, the arms $q'$, and the pitmen connecting the said arms with the rock-shafts O, substantially as and for the purpose described.

3. In a corn-harvester having a fodder-box at each side, the combination, with the pairs of ejectors, of the operating-shaft Q, the arms S on the said shaft, and the pitmen connecting the said arms S with the said ejectors, substantially as described.

4. In a corn-harvester, the combination, with the platform balanced on axle B and having fodder-boxes on each side and cutting-knives at the front ends of the fodder-boxes, the thills and means for adjusting the thills relatively to the platform, the rock-shafts O, having arms $o$, the ejectors, the operating-shafts, means for connecting the operating-shaft with the rock-shafts and with the ejectors, the sprocket-wheel D and sleeve $d$ on the axle, the levers $d'$ and $d^3$ for moving sleeve $d$ and holding it in the located position, the counter-shaft G, operated from sprocket-wheel D, the reel-gearing connecting the reels with the said shaft G, and the fenders K, substantially as and for the purpose set forth.

In testimony whereof I affix my signature in presence of two witnesses.

WILLIAM ORCUTT.

Witnesses:
JOHN J. COOPER,
M. N. JENNS.